US005328756A

United States Patent [19]

Wright et al.

[11] Patent Number: 5,328,756

[45] Date of Patent: Jul. 12, 1994

[54] TEMPERATURE SENSITIVE CIRCUIT BREAKING ELEMENT

[75] Inventors: Robin E. Wright, Inver Grove Heights; William V. Balsimo, Afton, both of Minn.

[73] Assignee: Minnesota Mining and Manufacturing Company, St. Paul, Minn.

[21] Appl. No.: 829,764

[22] Filed: Jan. 31, 1992

[51] Int. Cl.[5] .................................... B32B 7/02

[52] U.S. Cl. .................... 428/220; 428/313.5; 428/317.9; 428/422; 521/55

[58] Field of Search ............... 428/327, 323, 325, 332, 428/336, 343, 355, 356, 313.5, 317.9, 311.1, 422, 420

[56] References Cited

U.S. PATENT DOCUMENTS

| | | | |
|---|---|---|---|
| 3,953,566 | 4/1976 | Gore | 264/288 |
| 3,962,153 | 6/1976 | Gore | 260/2.5 R |
| 4,042,747 | 8/1977 | Breton et al. | 428/323 |
| 4,096,227 | 6/1978 | Gore | 264/210 R |
| 4,098,945 | 7/1978 | Oehmke | 428/327 |
| 4,153,661 | 5/1979 | Ree et al. | 264/120 |
| 4,187,390 | 2/1980 | Gore | 174/102 R |
| 4,199,628 | 4/1980 | Caines | 428/36 |
| 4,208,194 | 6/1980 | Nelson | 55/158 |
| 4,265,952 | 5/1981 | Caines | 428/36 |
| 4,267,542 | 5/1981 | Weiner | 337/227 |
| 4,313,047 | 1/1982 | Cox et al. | 219/253 |
| 4,373,519 | 2/1983 | Errede et al. | 128/156 |
| 4,460,642 | 7/1984 | Errede et al. | 428/283 |
| 4,483,889 | 11/1984 | Andersson | 427/389.9 |
| 4,565,663 | 1/1986 | Errede et al. | 264/120 |
| 4,581,674 | 4/1986 | Brzozowski | 361/104 |
| 4,722,898 | 2/1988 | Errede et al. | 435/182 |
| 4,757,423 | 7/1988 | Franklin | 361/275 |
| 4,810,381 | 3/1989 | Hagen et al. | 210/502.1 |
| 4,871,671 | 10/1989 | Errede et al. | 435/182 |
| 4,900,544 | 2/1991 | Asaumi et al. | 521/145 |
| 4,902,747 | 2/1990 | Kassal et al. | 525/151 |
| 4,906,378 | 3/1990 | Hagen et al. | 210/635 |
| 4,914,156 | 4/1990 | Howe | 525/166 |
| 4,923,737 | 5/1990 | De La Torre | 428/217 |
| 4,945,125 | 7/1990 | Dillon et al. | 527/427 |
| 4,946,737 | 8/1990 | Lindeman et al. | 428/283 |
| 4,962,136 | 10/1990 | Peters | 523/220 |
| 4,966,941 | 10/1990 | Subramanian | 525/66 |
| 4,971,697 | 11/1990 | Douden et al. | 210/502.1 |
| 4,971,736 | 11/1990 | Hagen et al. | 264/22 |
| 4,985,296 | 1/1991 | Mortimer, Jr. | 428/220 |
| 5,019,232 | 5/1991 | Wilson et al. | 204/182.8 |
| 5,029,967 | 5/1993 | Wright et al. | 428/283 |
| 5,071,610 | 12/1991 | Hagen et al. | 264/120 |

OTHER PUBLICATIONS

Midwest Components, Inc., Product Data Sheet (1987).
Raychem Product Data Sheets (May 1988, Nov. 1987, Oct. 1989, Jun. 1990, and Apr. 1991).
R. Woolnough, Electronic Engineering Times, Dec. 2, 1991, p. 39.

*Primary Examiner*—George F. Lesmes
*Assistant Examiner*—Chris Raimund
*Attorney, Agent, or Firm*—Gary L. Griswold; Walter N. Kirn; Lorraine R. Sherman

[57] ABSTRACT

A composite article comprising a fibrillated polytetrafluoroethylene (PTFE) matrix, electrically conductive particles, and energy expandable, electrically nonconductive hollow polymeric particles, which composite is conductive and allows for the flow of electricity and which, upon attaining a temperature which causes expansion of the expandable polymeric particles, becomes insulating and causes the flow of electricity to cease. The articles are thin and can be used as electrical circuit breaking elements.

17 Claims, No Drawings

TEMPERATURE SENSITIVE CIRCUIT BREAKING ELEMENT

TECHNICAL FIELD OF THE INVENTION

This invention relates to a temperature sensitive circuit breaking element and a method therefor, the element comprising a polytetrafluoroethylene (PTFE) fibril matrix having both conductive particles and energy expandable particles enmeshed therein.

BACKGROUND OF THE INVENTION

Specially designed mechanical switching devices are known for making, carrying, and breaking electrical circuits under normal conditions as well as performing in a special way under abnormal conditions. These are common devices to protect a circuit against excess current flow, a useful example of which is called a fuse.

Thermal fuses useful in electrical or electronic applications are known. U.S. Pat. No. 4,267,542 describes a device for a thermal fuse for use with an electrical apparatus in which easy access to the thermal fuse element (not specifically described) is allowed. U.S. Pat. No. 4,313,047 describes a fuse element which provides thermostatic control and thermal fuse overtemperature protection for an electrical heating device. U.S. Pat. No. 4,581,674 describes a thermal fuse element comprising an alloy having a eutectic composition at a predetermined threshold. Upon exposure to excessive heat, the alloy melts and the circuit opens. U.S. Pat. No. 4,757,423 relates to a fuse for an electronic component which incorporates a pad of a fusible material, preferably comprised of metal coated polymeric particles. Upon overheating, the metal melts and is dispersed within the polymer.

Midwest Components, Inc., Product Data Sheet (1987) and Raychem Product Data Sheets (5/88, 11/87, 10/89, 6/90, and 4/91) disclose PolySwitch™ Products for reversible circuit breaking applications. The articles contain a homogeneous mixture of polyolefin and carbon and have an electrical resistance which increases with temperature or overcurrent.

Expanded polytetrafluoroethylene-containing articles are known to provide thermal insulation. Related U.S. Pat. Nos. 3,953,566, 3,962,153, 4,096,227, and 4,187,390 teach a porous product comprising expanded, amorphous locked PTFE which can be laminated and impregnated to provide shaped articles. The more highly expanded materials of that invention are disclosed to be useful, for example, as thermal insulators and shaped articles.

PTFE fibrillated matrices are known. The background art teaches several formulations for blending an aqueous PTFE dispersion with various additives and/or adjuvants designed for specific purposes. For example, U.S. Pat. No. 4,990,544 teaches a gasket comprising a fibrillated PTFE resin and dispersed therein a fine inorganic powder. U.S. Pat. No. 4,985,296 teaches an expanded, porous PTFE film containing filler material which is purposely compressed to provide thin films where space reduction is desirable.

U.S. Pat. Nos. 4,971,736, 4,906,378, and 4,810,381 disclose a chromatographic sheetlike article and method of preparing a composite chromatographic sheetlike article comprising a PTFE fibril matrix and nonswellable sorptive hydrophobic particles enmeshed in the matrix. References cited in these patents relate to other PTFE matrices containing particulates, including U.S. Pat. Nos. 4,153,661, 4,373,519, 4,460,642, and 4,565,663.

It is known that metals can be incorporated in fibrillated PTFE, as in, for example, U.S. Pat. No. 4,153,661. U.S. Pat. No. 4,923,737 discloses a method for a "metal cloth" prepared from fibrillated PTFE containing metal or other particles entrapped in the fibrils.

A composition comprising fibrillated PTFE in combination with a polyamide has been disclosed to provide articles by extrusion blowmolding as in U.S. Pat. No. 4,966,941, and with molybdenum disulfide and optionally an elastomer to provide articles with increased durability as in U.S. Pat. No. 4,962,136.

U.S. Pat. No. 4,945,125 teaches a process of producing a fibrillated semi-interpenetrating polymer network of PTFE and silicone elastomer. U.S. Pat. No. 4,914,156 describes a blow moldable composition comprising a polyether, an epoxide polymer, a source of catalytic cations, and a fibrillatable PTFE. U.S. Pat. No. 4,902,747 discloses a blow moldable polyarylate composition containing fibrillatable PTFE.

Vermicular expanded graphite has been incorporated into PTFE. U.S. Pat. Nos. 4,265,952 and 4,199,628 relate to a vermicular expanded graphite composite blended with a corrosion resistant resin such as PTFE with improved impermeability to corrosive fluids at high temperatures.

Conductive compositions comprising a polymeric binder system having dispersed therein electrically conductive particles and deformable non-conductive spherical domains have been disclosed, for example, in U.S. Pat. No. 4,098,945. Similar compositions have been disclosed to be useful as fuses in R. Woolnough, Electronic Engineering Times, Dec. 2, 1991, p 39.

U.S. Pat. No. 4,483,889 teaches a method for making a foam composite material comprising a fibrous matrix, expandable polymeric microspheres, and a formaldehyde-type resin.

SUMMARY OF THE INVENTION

Briefly, the present invention provides an electrically conductive composite article comprising a polytetrafluoroethylene (PTFE) fibril matrix having enmeshed therein (a) electrically conductive particles, and (b) electrically nonconductive, energy expandable hollow polymeric particles.

Preferably, the weight ratio of conductive particles to nonconductive, energy expandable hollow polymeric particles is in the range of about 999:1 to about 3:1. The total amount of particulates to fibril matrix is preferably from about 98:2 to about 75:25 by weight.

In a preferred embodiment, the article of this invention can be placed between two conductive surfaces, such as metal plates, and can serve as an irreversible electrical circuit breaking element (fuse element) when an electrical current is provided, such as from a DC power supply. Flow of current can be sustained over long periods of time but when too great a current is provided, resistive heating of the circuit breaking element occurs causing the energy expandable hollow polymeric microspheres to expand and the resistance of the fuse element to increase, thus breaking or opening the circuit. Similarly, if the temperature of the environment, in which the circuit containing the circuit breaking element is located, increases and attains or surpasses the temperature at which the expandable particulate of the article expands, the circuit opens. Expansion of the hollow polymeric microspheres leads to irreversible opening of the circuit, i.e., failure of the circuit breaking element.

The composite article is prepared by a method including the steps of admixing conductive particles, nonconductive, energy expandable hollow polymeric particles, and a PTFE dispersion to achieve a mass having a doughlike consistency, and calendering the doughlike mass between rollers set at successively narrower gaps at a temperature below the temperature of expansion of the nonconductive energy expandable particles for a number of passes necessary to achieve a sheetlike article having a thickness in the range of about 0,010 cm to 0.32 cm.

The microporous composite sheet-like article, a chamois-like material, is very conformable yet tough enough to provide some protection against the abrasive and penetrating effects of foreign objects. It maintains its physical integrity under normal handling conditions.

Assignee's copending application, U.S. Ser. No. 07/723,064 discloses a composite article comprising a fibrillated polyolefin matrix having either an energy expandable or an energy expanded hollow polymeric particulate enmeshed therein, the article being useful as a thermal insulator. Also, assignee's copending application, U.S. Ser. No. 07/722,665, discloses a sheetlike article comprising a fibrillated polytetrafluoroethylene matrix having either an energy expandable or an energy expanded hollow polymeric particulate and a sorptive particulate enmeshed therein, the composite sheetlike articles having controlled interstitial porosity and being useful in the separation and purification sciences. Additionally, assignee's copending application, U.S. Ser. No. 07/828,513 (now U.S. Pat. No. 5,209,967), filed the same date as this application, discloses a composite article comprising PTFE having enmeshed therein conductive particles and energy expanded hollow polymeric particles. The article is not conductive in bulk but can be made so by the application of pressure.

DETAILED DESCRIPTION OF THE PREFERRED EMBODIMENTS

In a preferred embodiment, this invention provides a composite membrane, or sheetlike article, which can be used as a thermal, or temperature sensitive, fuse element. The composite article of the present invention is conductive, i.e., electrical current can be made to flow through the composite article with little internal resistance. When heated, the nonconductive, energy expandable hollow polymeric particles are caused to expand within the fibrillated matrix of the article. Once expanded, the resistance of the composite article increases by several orders of magnitude resulting in a rapid drop in the ability of the composite article to carry electrical current, i.e., the article becomes insulating.

Electrically conductive particulate is present as the major component (preferably greater than 50 weight percent) of the composite membrane in a fibrillated PTFE matrix. Electrically nonconductive, energy expandable hollow polymeric particulate, referred to as expandable particulate or expandable particles, is present as a minor component (preferably less than 50 weight percent) in the fibrillated PTFE matrix. The composite membrane shows good bulk conductivity, that is, the resistivity of the composite membrane is less than about 1000 ohm-cm, preferably less than 100 ohm-cm, most preferably less than 50 ohm-cm. Upon exposure to heat, the electrically nonconductive, energy expandable particulate is caused to expand. Resistivity of the composite membrane after expanding increases to greater than about $10^5$ ohm-cm, preferably greater than $10^6$ ohm-cm, and most preferably greater than $10^7$ ohm-cm. The heat needed to cause expansion of the membrane may either be the result of a change in the ambient temperature of the environment in which the composite of the invention is being used or else it may arise from resistive heating of the composite itself due to flow of electrical current.

Electrically conductive particulate enmeshed within the fibrillated PTFE matrix, or network, is the major component of the composite and can be any conductive particulate such as carbon, metal powder, metal bead, metal fiber, or metal flake, or it can be a metal coated particulate such as metal coated glass bubbles, metal coated glass beads, or metal coated mica flakes. Preferred metal coatings include silver, nickel, copper, gold, and tungsten. Carbon coated particles are also useful. Such coatings can be continuous or discontinuous. When continuous coatings are present, their thicknesses can be more than zero and up to 10 micrometers or more. Additionally, a combination of two or more conductive particulates can be used.

Size of the conductive particulate can be from about 0.1 micrometer to about 600 micrometers, preferably from 0.5 micrometer to 200 micrometers, and most preferably from 1 micrometer to 100 micrometers. Powder resistivity of the conductive particulate should be less than about 10 ohm-cm, preferably less than 1 ohm-cm, and most preferably less than $10^{-1}$ ohm-cm. Where metal powders are used, the powder resistivity can be as low as about $10^{-6}$ ohm-cm.

Shape of the conductive particulate can be regular or irregular. Where essentially isotropic conductivity is desired, spherical particulate are preferred. It is well known in the art that use of anisotropic conductive particles such as conductive flakes and fibers greatly increases xy, or inplane, conductivity in sheetlike articles. We have also found that by incorporating conductive flakes, such as silver coated mica flakes, with conductive bubbles or beads, conductivity in the xy plane goes up significantly. When current is to flow in the plane of a sheetlike article of the invention, it is desirable to incorporate anisotropic conductive particles such as conductive flakes or fibers.

Examples of conductive particulate useful in the present invention include copper powder, 10 micrometer (Alfa Products, Ward Hill, MA); silver coated nickel flake, −200 mesh (Alfa Products); silver coated hollow glass bubbles, solid glass beads, and mica flake (Potter Industries, Inc., Parsippany, NJ); and carbon powders (Aldrich Chemical Co., Milwaukee, WI).

Weight of conductive particulate to total weight of the composite article of the invention should be in the range from about 98% to about 25%, preferably from 96% to 40%, and more preferably from 95% to 50%.

Electrically nonconductive, energy expandable particulate is present as a minor component within the fibrillated PTFE network of the composite and is typically a polymeric bubble. Expandable particulate useful in the present invention exhibits intumescence upon application of heat and can be swellable or non-swellable in aqueous or organic liquid, and preferably is substantially insoluble in water or organic liquids used in preparation of the composite membranes. In addition, the expandable particulate is not homogeneous, i.e., it is not a polymeric bead but rather comprises a polymeric shell having a central core comprised of a fluid, preferably liquid, material. A further characteristic is that the overall dimensions of the expandable particulate increase upon heating at a specific temperature. This expansion or intumescence is different from expansion due to solvent swelling and can occur in the solid state (i.e., in the absence of solvent). Additionally, the expandable particulate is preferably electrically nonconductive, i.e., the powder resistivity of the energy expandable particulate should be greater than about $10^4$ ohm-cm, preferably greater than $10^5$ ohm-cm, and most preferably greater than $10^6$ ohm-cm.

Expandable hollow polymeric particulate includes those materials comprised of a polymeric shell and a core of at least one other material, either liquid or gaseous, most preferably a liquid at room temperature, in which the polymeric shell is essentially insoluble. A liquid core is advantageous because the degree of expansion is directly related to the volume change of the core material at the expansion temperature. For a gaseous core material, the volume expansion expected can be approximated from the general gas laws. However, expandable particulate comprising a liquid core material offers the opportunity to provide much larger volume changes, especially in those cases where a phase change takes place, i.e., the liquid volatilizes at or near the expansion temperature. Gaseous core materials include air and nonreactive gases and liquid core materials include organic liquids.

Preferred expandable polymeric particulate (also called microspheres, microballoons, and microbubbles) can have shells comprising copolymers such as vinyl chloride and vinylidene chloride, copolymers of vinyl chloride and acrylonitrile, copolymers of vinylidene chloride and acrylonitrile, copolymers of methacrylonitrile and acrylonitrile, and copolymers of styrene and acrylonitrile. Further can be mentioned copolymers of methyl methacrylate containing up to about 20 percent by weight of styrene, copolymers of methyl methacrylate and up to about 50 percent by weight of ethyl methacrylate, and copolymers of methyl methacrylate and up to about 70 percent by weight of orthochlorostyrene. The unexpanded microspheres contain fluid, preferably volatile liquid, i.e., a blowing agent, which is conventional for microspheres of the type described here. Suitably, the blowing agent is 5 to 30 percent by weight of the microsphere. The microspheres can be added in different manners, as dried particles, wet cakes, or in a suspension, e.g. in an alcohol such as isopropanol.

Unexpanded particulate desirably is in the size range of from about 0.1 micrometer to about 600 micrometers, preferably from 0.5 micrometer to 200 micrometers, most preferably from 1 micrometer to 100 micrometers. Expanded particulate can have a size in the range of from about 0.12 micrometer to 1000 micrometers, preferably from 1 micrometer to 600 micrometers. After expansion, the volume of the expandable particulate increases by a factor of at least 1.5, preferably a factor of at least 5, and most preferably a factor of at least 10, and may even be as high as a factor of about 100.

As an example, Expancel TM polymeric microspheres (Nobel Industries, Sundsvall, Sweden) expand from an approximate diameter of 10 micrometers in the unexpanded form to an approximate diameter of 40 micrometers after expansion. The corresponding volume increase is $$V_f/V_i=(r_f/r_i)^3=4^3,$$

or 64-fold, where $V_f$ and $r_f$ are the final volume and radius of the expandable particulate, respectively, after expansion, and $V_i$ and $r_i$ are the corresponding initial values for the unexpanded particulate.

Nobel Industries provides a series of expandable polymeric microspheres which expand at different temperatures. Examples of commercially available expandable hollow polymeric microspheres useful in the present invention include those made of poly(vinylidene chloride-coacrylonitrile) such as Expancel TM 820, Expancel TM 642, Expancel TM 551, Expancel TM 461, and Expancel TM 051 polymeric microspheres. Other commercially available materials having similar constructions and comprising, for example, a shell of poly(methacrylonitrile-co-acrylonitrile), available as Micropearl TM F-80K microbubbles (Matsumoto Yushi-Seiyaku Co., Ltd., Japan) and Expancel TM 091 are also useful as expandable particulate in the present invention.

A wide variety of blowing or raising agents may be enclosed within the polymeric shell of the expandable microspheres. They can be volatile fluid-forming agents such as aliphatic hydrocarbons including ethane, ethylene, propane, propene, butane, isobutane, isopentane, neopentane, acetylene, hexane, heptane, or mixtures of one or more such aliphatic hydrocarbons preferably having a number average molecular weight of at least 26 and a boiling point at atmospheric pressure about the same temperature range or below the range of the softening point of the resinous material of the polymeric shell when saturated with the particular blowing agent utilized.

Other suitable fluid-forming agents are halocarbons such as fluorotrichloromethane, perfluorobutanes, perfluoropentanes, perfluorohexanes, perfluoroheptanes, dichlorodifluoromethane, chlorotrifluoromethane, trichlorotrifluoroethane, heptafluorochlorocyclobutane, and hexafluorodichlorocyclobutane, and tetraalkyl silanes such as tetramethyl silane, trimethylethyl silane, trimethylisopropyl silane, and trimethyl-n-propyl silane, all of which are commercially available. Further discussion of blowing agents in general can be found in U.S. Pat. Nos. 4,640,933 and 4,694,027, which patents are incorporated herein by reference.

Preparation of expandable particulate is normally accomplished by suspension polymerization. A general description of some of the techniques that can be employed and a detailed description of various compositions that are useful as expandable particulate can be found in U.S. Pat. No. 3,615,972. A further description of compositions useful as expandable particulate in the present invention is given in U.S. Pat. No. 4,483,889. Both patents are incorporated herein by reference.

The shape of the expandable particulate is preferably spherical but is not restricted to spherical, i.e., it may be irregular. Other shapes can easily be envisioned such as urnlike as described in U.S. Pat. No. 3,615,972. Shape and orientation of the expandable particulate in the composite membrane determine the anisotropy of the expansion step. Where essentially spherical particles are used, heating leads to isotropic expansion of the composite, i.e., expansion is uniform in all three directions, so that the overall shape of the membrane does not change, only its size. Other physical constraints that may have been imposed on the membrane, such as during processing or by anchoring one part of the membrane prior to expansion, may lead to less than perfect isotropic expansion where essentially spherical expandable particulate is used.

The PTFE aqueous dispersion employed in producing the PTFE composite sheets of this invention is a milky-white aqueous suspension of PTFE particles. Typically, the PTFE aqueous dispersion will contain about 20% to about 70% by weight solids, the major portion of such solids being PTFE particles having a particle size in the range of from about 0.05 micrometer to about 5.0 micrometers. PTFE aqueous dispersions useful in the present invention may contain other ingredients, for example, surfactant materials and stabilizers which promote continued suspension of the PTFE particles.

Such PTFE aqueous dispersions are presently commercially available from E.I. Dupont de Nemours (Wilmington, DE), for example, under the tradenames Teflon TM Teflon TM 30B, or Teflon TM 42. Teflon 30 and 30B contain about 59% to about 61% solids by weight which are for the most part 0.05 micrometer to 5.0 micrometer PTFE particles and from about 5.5% to about 6.5% by weight (based on weight of PTFE resin) of non-ionic wetting agent, typically octylphenol polyoxyethylene or nonylphenol polyoxyethylene. Teflon 42 contains about 32% to 35% by weight solids and no wetting agent. Fluon TM PTFE, having reduced surfactant levels, is available from ICI, Exton, PA.

Composite articles of the invention can be provided by the method described in any of U.S. Pat. Nos. 5,071,610, 4,971,736, 4,906,378, 4,810,381, and 4,153,661 which are incorporated herein by reference. In all cases, processing takes place below the temperature for expansion of the expandable particulate. This processing temperature preferably is room temperature.

Thickness of the composite membrane of the invention can range from about 0.010 cm to about 0.32 cm, preferably from 0.012 cm to 0.25 cm. When the membrane is too thin, it has very little structural integrity while membranes having thicknesses outside of the given range may be difficult to form. Thinner membranes can be made by densification as is described in U.S. Pat. No. 4,985,286. When thinner membranes are desired, it is advantageous to avoid using metal coated glass bubbles or other fairly fragile supports in order to avoid possible breakage which may occur under pressures applied during formation of the fibrillated PTFE network.

When expansion of the expandable particulate results from resistive heating due to flow of electrical current, localized volume of the fuse element increases and outer dimensions of the element increase in the affected area. The amount of expansion observed is dependent on several factors, including weight percent of expandable particulate present in the membrane, type of expandable particulate, molecular weight of the polymeric shell of the expandable particulate, and toughness of the fibrillated PTFE matrix holding the composite together. A small dimensional increase, i.e., in the range of 0.5 to 10 percent is usually sufficient to change the electrical properties of the membrane from a conducting to an insulating state.

Temperatures needed for the thermal expansion step to occur are dependent on the type of polymer comprising the shell of the microbubble and on the particular blowing agent used. Typical temperatures range from about 40° C. to about 220° C., preferably from 60° C. to 200° C., most preferably from 80° C. to 190° C. Higher expansion temperature of expandable particulate correlates with increased current carrying capacity for a given composition and geometry.

Useful electrical current ranges can vary widely, depending on the composition of the membrane and the cross sectional area through which the flow of electrons must pass. Practical currents range from about 0.0001 ampere to 100 amperes, preferably from 0,001 ampere to 50 amperes, most preferably from 0.01 ampere to 20 amperes. The length of time required for interruption of the circuit is dependent on the heat generated due to the flow of electricity.

Composite membranes of the invention, when subjected to ambient temperatures which cause expansion of the expandable particulate, can find utility as fire safety devices.

Optionally, other components or adjuvants can be added to the composite membrane to impart some added functionality such as color or strength to the final composite. When present, adjuvants can be included in an amount from about 0.01% to about 50% by weight, preferably from 0.1% to 40%, and most preferably from 0.5% to 25%, based on the total weight of the composite. As with expandable particulate, additional components can be swellable or non-swellable in aqueous or organic liquid, and preferably are substantially insoluble in water or organic liquids.

Optional adjuvants can be in the size range of from about 0.1 micrometer to about 600 micrometers, preferably from 0.5 micrometer to 200 micrometers, most preferably from 1 micrometer to 100 micrometers. This size range is desirable in order to obtain the best physical properties such as toughness and uniformity for the resulting membrane.

It is important that the fibrillated network be tight enough to support the enmeshment of the conductive particulate and the expandable particulate so that the final composite has sufficient structural integrity to be handled. In the present invention, the conductive particulate and the expandable particulate do not easily dislodge from the final composite, i.e., they do not fall out of the membrane when the membrane is handled. A further advantage of a PTFE fibrillated network is that the PTFE fibrils are able to flow or draw out as the expandable particulate expands, thereby maintaining the structural integrity of the membrane. In addition, the poor chemical bonding of PTFE to the expandable particulate also allows the fibrils to 'slide' from a given microbubble's surface during the expansion step, i.e., there is poor adhesion of the fibrils to the polymeric shell of the microbubbles. The useful range of fibrillated polymer in the final composites can be from about 2% to about 25% by weight, preferably from 3% to 23%, and most preferably from 5% to 20%, based on the total weight of the composite.

Preferably, the articles of the invention are thin and can be used as electrical circuit breaking elements. Such elements can also be useful in a fire safety device.

Objects and advantages of this invention are further illustrated by the following examples, but the particular materials and amounts thereof recited in these examples, as well as other conditions and details, should not be construed to unduly limit this invention.

EXAMPLES

Example 1

This example describes the preparation of a fibrillated PTFE polymer network in which a conductive particulate and a nonconductive, energy expandable particulate are enmeshed. The resulting composite has utility as a thermal fuse element.

Ten grams of SH230S33 Conduct-o-Fil TM silver coated hollow glass spheres (Potter Industries, Inc., Parsippany, NJ) were mixed with 0.5 grams of Expancel 551DU hollow polymeric microbubbles (Nobel Ind.) to give an intimate mix of the particulates. To this was added a PTFE dispersion prepared by adding 10 grams of a 50% by volume solution of i-propanol in water to 11 grams Fluon PTFE aqueous dispersion (22.9% solids) (ICI). The mixture was hand mixed with a spatula until it had a doughlike consistency. The doughball was then passed through a two roll mill, at room temperature (23° C), set at a gap of approximately 0.5 cm for a total of ten passes, folding the product and turning 90 ©prior to each successive pass. This gave a tough web which was then passed through the mill an additional 6 passes, decreasing the gap slightly for each pass. The final product had a thickness of 0.11 cm and was homogeneous on a macroscopic scale. The resistance measured through the thickness was less than 1 ohm.

Example 2

This example describes the application of a composite membrane as a thermal fuse element.

A 0.56 cm diameter disc cut from the membrane of Example 1 (surface area of 1 cm$^2$) was placed in a device connected to the output of a Hewlett Packard Model 6247B 0-60 V DC power supply. The device was designed such that any current would have to flow through the thickness of the membrane, that is, the membrane was positioned in the circuit so as to be a fuse element. A constant current of 1 ampere was drawn through the circuit. The mass of the device itself acted as a heat sink so that resistive heating of the membrane was minimized. After 30 minutes under these conditions with no visible change in performance, the entire assembly was placed onto the hot surface of a preheated hot plate (approximately 200° C.). Within 2 minutes, the current dropped to 0 amperes indicating that the temperature of the membrane had increased to the expansion temperature of the expandable polymeric bubbles. Once the bubbles expanded, the resistance of the membrane increased several orders of magnitude resulting in interruption of the current flow. The thermal fuse element can be used in a fire safety device.

Example 3

This example describes the preparation of a composite membrane and its use as a fuse element. The current traverses the membrane in a vertical mode, i.e., through the membrane's thickness.

A membrane prepared according to the procedure of Example 1 was made except the silvered glass bubbles were replaced with S3000-SMM silvered glass beads (Potter Ind.). The final thickness of the membrane was 0,025 cm. A sample of the membrane was placed between two tungsten slugs, each measuring 6.5 millimeters in diameter and about 8 millimeters long. The slugs were connected to the output of the DC power supply. A 1 ampere current was drawn through the membrane for more than 10 minutes with no change. When the current was increased to 2 amperes, the fuse blew due to expansion of expandable particulate. This demonstrated the ability of the conductive membranes to act as fuse elements in an electrical circuit.

Example 4

This example describes the preparation of a fibrillated PTFE polymer network in which a conductive bead, a conductive flake, and a nonconductive, energy expanded particulate are enmeshed. The article has use as a temperature sensitive fuse element in which the current is carried in the longitudinal, or lengthwise, direction.

A sheetlike article of the invention was made according to the method of Example 1 containing 38 g S3000-SMM conductive glass beads (Potter Ind.), 10 g SM325F55 conductive flakes (Potter Ind.), and 2 g Expancel 551DU polymeric microspheres (Nobel Ind.). The final web had a thickness of 0,025 cm and a PTFE content of 10%. Four 1.27 × 5.72 cm strips were cut from the center of the sheet along the downweb axis. Each individual strip was then clamped at its ends, using a glass microscope slide for support, by attaching two Hoffman clamps at a separation of 5.0 cm. In addition to maintaining the strips in a set position, the clamps also allowed for easy electrical contact to be made. The leads from a Hewlett Packard Model 6247B 0-60 V DC power supply were connected to the clamps, using an inline Simpson Model 460-6 multimeter to monitor the current flowing through the circuit. The applied voltage was read directly off the meter on the power supply and periodically checked by measuring the voltage using a portable Simpson Model 260 multimeter connected across the two clamps. When a 1 volt potential was applied, an average current of 36.5 milliamperes was drawn through the membranes. This corresponds to an approximate resistance of 30 ohms. When the applied voltage was increased, the current flowing through the membrane increased in a near linear fashion. However, when the current reached a value near 500 milliamperes, the voltage increased rapidly to the preset limiting value of the power supply while the current dropped to zero amperes on the meter. The failure of the fuse element was irreversible.

Example 5

This example describes a membrane having a higher current carrying capacity as a result of changing the type of expandable particulate.

A sheetlike article was prepared according to the method of Example 4 but which contained Expancel 091DU polymeric microspheres (Nobel Ind.) in place of Expancel 551DU microspheres. The initial resistance of a strip cut as in Example 4 was found to be about 5 ohms. The strip performed in an identical fashion to the membrane of Example 4 except that it was able to sustain currents of approximately 1 ampere before failing. The failure was again irreversible. This example shows that use of an expandable particulate having a higher expansion temperature increases the current carrying capacity of the membrane.

Example 6 (Comparative)

This example describes the performance of a membrane containing no energy expandable hollow polymeric microspheres.

A membrane was prepared according to the method of Example 1 which contained 40 g S3000-SMM conductive glass beads (Potter Ind.) and 10 g SM325F55 conductive flakes (Potter Ind.). The final membrane contained 72.1% bead, 18.0% flake, and 9.9% PTFE and had a thickness of 0.025 cm. The membrane was connected to the DC power supply as in Example 4 and had an initial resistance of 10 ohms. Voltage was applied to the metallic clamps restraining the membrane and the current measured. As applied voltage was increased, current increased in a parallel fashion. It was found that high currents could be sustained through the membrane. Eventually, however, failure occurred due to pyrolysis of the PTFE membrane. This resulted in the appearance of a hole, or burn spot, in the strip. The temperature at which the membrane failed was a property of the PTFE in the membrane and was invariant. This composition, in which there is no energy expandable particulate, did not make an acceptable fuse element.

Various modifications and alterations of this invention will become apparent to those skilled in the art without departing from the scope and spirit of this invention, and it should be understood that this invention is not to be unduly limited to the illustrative embodiments set forth herein.

We claim:

1. An electrically conductive composite article comprising a polytetrafluoroethylene fibril matrix having enmeshed therein (a) electrically conductive metal-containing particles, and (b) electrically nonconductive, energy expandable hollow polymeric particles, said composite article having a resistivity of less than about 1000 Ω.cm prior to expansion of said energy expandable particles and greater than about $10^5$ Ω. cm after expansion of said energy expandable particles.

2. The composite article according to claim 1 wherein the weight ratio of conductive particles to nonconductive particles is in the range of 999:1 to 3:1.

3. The composite article according to claim 1 wherein the weight ratio of total particles to fibril matrix is in the range of 98:2 to 75:25.

4. The composite article according to claim 1 wherein said conductive particles are metal particles or metal coated particles.

5. The composite article according to claim 4 wherein said metal or metal-coated particles are powder, flakes, bubbles, fibers, or beads.

6. The composite article according to claim 1 wherein said article has a resistivity of less than 50 ohm-cm.

7. An electrically conductive composite article comprising a polytetrafluoroethylene fibril matrix having enmeshed therein (a) electrically conductive metal-containing particles, and (b) electrically nonconductive, energy expandable hollow polymeric particles having a polymeric shell and a liquid or gaseous core said composite article having a resistivity of less than about 1000 Ω.cm prior to expansion of said energy expandable particles and greater than about $10^5$ Ω.cm after expansion of said energy expandable particles.

8. The composite article according to claim 7 wherein said nonconductive expandable particles have shells comprising copolymers selected from the group consisting of vinyl chloride and vinylidene chloride, vinyl chloride and acrylonitrile, vinylidene chloride and acrylonitrile, styrene and acrylonitrile, methyl methacrylate and styrene, methyl methacrylate and ethyl methacrylate, methacrylonitrile and acrylonitrile, and methyl methacrylate and orthochlorostyrene.

9. The composite article according to claim 1 wherein said conductive particles have a size in the range of 0.1 to 600 micrometers.

10. The composite article according to claim 1 wherein said nonconductive expandable particles expand at a temperature in the range of 40° to 220° C.

11. The composite article according to claim 7 wherein said shell of said nonconductive expandable particles are poly(vinylidene chloride-co-acrylonitrile).

12. The composite article according to claim 7 wherein said shell of said nonconductive expandable particles is poly(methacrylonitrile-co-acrylonitrile).

13. The composite article according to claim 1 which is a membrane having a thickness in the range of 0.010 cm to 0.32 cm.

14. The composite article according to claim 1 wherein said composite article has a resistivity of less than about 100 Ω.cm prior to expansion of said energy expandable particles and greater than about $10^6$ Ω.cm after expansion of said energy expandable particles.

15. The composite article according to claim 1 wherein said composite article has a resistivity of less than about 50 ≠. cm prior to expansion of said energy expandable particles and greater than about $10^7$ Ω.cm after expansion of said energy expandable particles.

16. An irreversible fuse element comprising a polytetrafluoroethylene fibril matrix, having enmeshed therein a) electrically conductive particles, and b) electrically nonconductive, energy expandable hollow polymeric particles said composite article having a resistivity of less than about 1000 Ω.cm prior to expansion of said energy expandable particles and greater than about $10^5$ Ω.cm after expansion of said energy expandable particles.

17. The fuse element according to claim 14 wherein said electrically conductive particles are selected from the group consisting of carbon, metal, and particles coated with at least one of carbon and metal.

* * * * *

UNITED STATES PATENT AND TRADEMARK OFFICE

CERTIFICATE OF CORRECTION

PATENT NO. : 5,328,756

DATED : July 12, 1994

INVENTOR(S) : Robin E. Wright et al.

It is certified that error appears in the above-indentified patent and that said Letters Patent is hereby corrected as shown below:

Col. 3, line 14, "0,010 cm" should read -- 0.010 cm --.

Col. 6, line 1, "$V_fV_i = (r_fr_i)^3 = 4^{3}$" should read -- $V_f/V_i = (rf/r_i)^3 = 4^3$, Col. 7, lines 19-20, "tradenames Teflon™" should read -- tradenames Teflon™ 30, --.

Col. 8, line 10, "0,001 ampere" should read -- 0.001 ampere --.

Col. 9, line 22, "90©" should read -- 90° --.

Col. 9, line 64, "0,025 cm" should read -- 0.025 cm --.

Col. 10, line 20, "0,025 cm" should read -- 0.025 cm --.

Col. 12, line 41, "50 ≠" should read 50 Ω --.

Col. 12, line 48, "particles said" should read -- particles, said --.

Col. 12, line 53, "claim 14" should read -- claim 16 --.

Signed and Sealed this

Third Day of September, 1996

Attest:

BRUCE LEHMAN

*Attesting Officer* *Commissioner of Patents and Trademarks*